US007273223B2

(12) United States Patent
Irgens et al.

(10) Patent No.: US 7,273,223 B2
(45) Date of Patent: Sep. 25, 2007

(54) TRAILER HITCH BALL

(75) Inventors: Christopher R. Irgens, Elm Grove, WI (US); John Weber, Thiensville, WI (US)

(73) Assignee: Master Lock Company LLC, Oak Creek, WI (US)

( * ) Notice: Subject to any disclaimer, the term of this patent is extended or adjusted under 35 U.S.C. 154(b) by 0 days.

(21) Appl. No.: 11/020,831

(22) Filed: Dec. 22, 2004

(65) Prior Publication Data

US 2005/0104327 A1     May 19, 2005

Related U.S. Application Data

(63) Continuation of application No. 10/209,291, filed on Jul. 30, 2002, now Pat. No. 6,846,002.

(60) Provisional application No. 60/308,643, filed on Jul. 30, 2001.

(51) Int. Cl.
B60D 1/06        (2006.01)
(52) U.S. Cl. ..................................................... 280/511
(58) Field of Classification Search ............. 280/415.1, 280/416.1, 511, 507
See application file for complete search history.

(56) References Cited

U.S. PATENT DOCUMENTS

| | | | |
|---|---|---|---|
| 3,796,074 A | | 3/1974 | Vik |
| 4,186,940 A | | 2/1980 | Pillars |
| 4,230,336 A | * | 10/1980 | Avrea et al. ................. 280/507 |
| 4,232,877 A | * | 11/1980 | Milton ..................... 280/416.1 |
| 4,577,884 A | | 3/1986 | Harris |
| 4,772,039 A | * | 9/1988 | Cook ....................... 280/416.1 |
| 4,774,823 A | | 10/1988 | Callison |
| 4,836,570 A | | 6/1989 | Lopez et al. |
| 4,989,892 A | | 2/1991 | Kevins et al. |
| 4,991,865 A | | 2/1991 | Francisco |
| 5,131,796 A | | 7/1992 | Herum et al. |
| 5,280,941 A | * | 1/1994 | Guhlin ........................ 280/507 |
| 5,290,057 A | | 3/1994 | Pellerito |
| 5,378,008 A | | 1/1995 | McCrossen |
| 5,409,320 A | * | 4/1995 | Maury et al. ................. 403/77 |
| 5,480,171 A | | 1/1996 | Cheffey |
| 5,511,814 A | * | 4/1996 | Floyd ......................... 280/507 |
| 5,573,263 A | | 11/1996 | Denny et al. |
| 5,730,456 A | | 3/1998 | Bowers |
| 5,738,362 A | | 4/1998 | Ludwick |
| 5,743,548 A | | 4/1998 | Gaspard |
| 5,860,669 A | * | 1/1999 | Wass et al. ................. 280/511 |
| 5,871,222 A | * | 2/1999 | Webb ......................... 280/511 |
| 5,873,271 A | | 2/1999 | Smith |

(Continued)

Primary Examiner—Lesley D. Morris
Assistant Examiner—Marc A. Scharich
(74) Attorney, Agent, or Firm—Calfee, Halter & Griswold, LLP

(57) ABSTRACT

A trailer hitch ball for use with a trailer hitch, a lock housing, a lock washer and a nut. The trailer hitch ball can be used to secure a trailer to a vehicle. The hitch ball includes a ball portion, a base portion and a threaded portion. The ball portion includes an integral drive member such that when torque is applied to the drive member, force is applied to the ball portion and the ball portion rotates relative to a trailer hitch. The outer surface of the ball portion may define two parallel and opposing tool engaging surfaces. When a trailer coupler is locked to the ball portion, the trailer and trailer hitch ball are secure from theft.

11 Claims, 4 Drawing Sheets

U.S. PATENT DOCUMENTS

| | | |
|---|---|---|
| 5,906,387 A | 5/1999 | Wallace |
| 5,908,201 A | 6/1999 | Van Vleet |
| 5,947,504 A | 9/1999 | Milazzo |
| 6,062,583 A | 5/2000 | Lauricella, Jr. |
| 6,203,050 B1 | 3/2001 | Stech |
| 6,206,400 B1 | 3/2001 | Stech |
| 6,286,852 B1 | 9/2001 | Slatten |
| 6,393,874 B1 | 5/2002 | Zapushek et al. |
| 6,402,181 B1 | 6/2002 | Lee |
| 6,406,052 B1 | 6/2002 | Bale |
| 6,494,477 B1 | 12/2002 | Parker |
| 6,588,790 B2 | 7/2003 | Hall |
| 6,783,144 B2 * | 8/2004 | McCoy et al. .............. 280/511 |
| 6,846,002 B2 | 1/2005 | Irgens et al. |

* cited by examiner

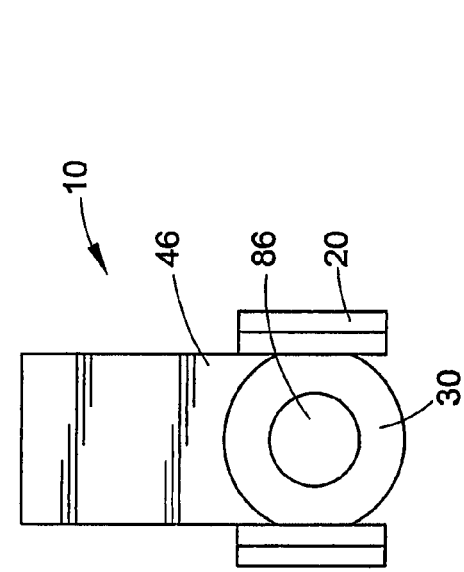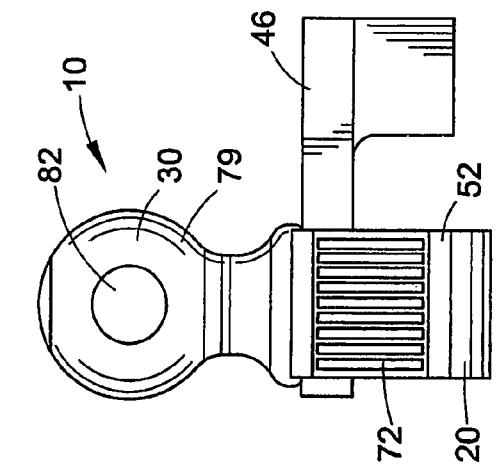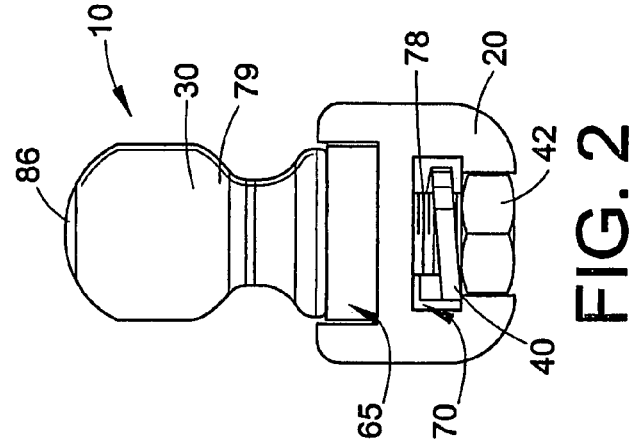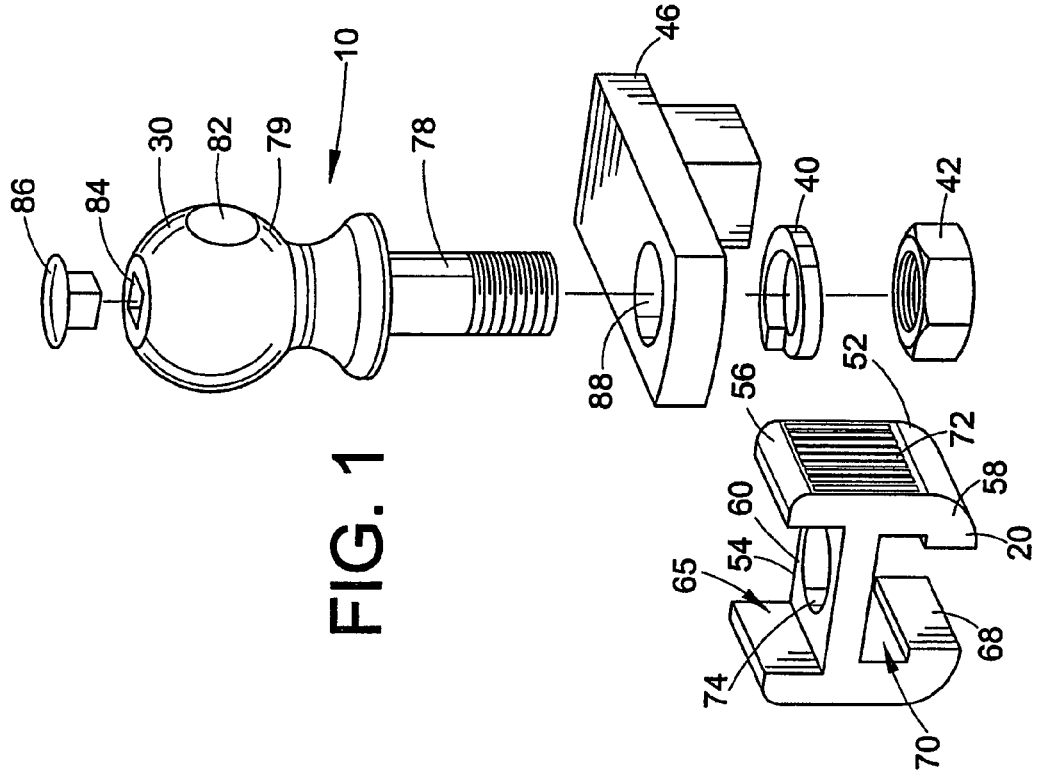

TRAILER HITCH BALL

CROSS-REFERENCE TO RELATED APPLICATIONS

This application is a continuation of U.S. patent application Ser. No. 10/209,291 filed Jul. 30, 2002 now U.S. Pat. No. 6,846,002, which claims priority to U.S. Provisional Patent Application Ser. No. 60/308,643, filed Jul. 30, 2001.

FIELD OF THE INVENTION

The invention relates to a trailer hitch ball for use with a trailer hitch.

BACKGROUND OF THE INVENTION

Automobile trailers are secured to the back of vehicles by connecting to a trailer ball hitch located on a receiver bar. The trailer hitch coupler locks around the trailer ball hitch thereby securing the trailer for towing and preventing the theft of the trailer. Conventional trailer locks, however, either do not provide a means for securing the trailer ball hitch or do not provide a means that secures the trailer ball hitch in an anti-theft manner. For example, many of the conventional trailer ball hitches are locked with conventional padlocks. Once the padlock is removed, the trailer ball hitch can be removed thereby allowing the trailer to be stolen.

Therefore, it is desirable to provide a lock that can secure a trailer ball hitch to prevent theft. It is further desirable to provide such a lock that be economically manufactured.

SUMMARY OF THE INVENTION

A lock assembly for securing a trailer and a lock for securing a ball hitch are provided. The lock includes a housing portion that secures the threaded portion of the ball hitch and prevents removal of the ball hitch.

In one embodiment, the lock assembly includes a ball hitch, a lock body, a lock washer and a nut. The nut is threaded onto the threaded portion of the ball hitch and the lock body prevents the nut from rotating.

In one embodiment the lock includes a two side members and one cross-bar member that intersects the side members. The cross-bar member has a hole for receiving the threaded member of a ball hitch. The lock further includes a first recess, formed by the side members and the cross-bar member, which receives a portion of a vehicle receiver bar. In one embodiment, the lock includes a second recess, formed the side members and the cross-bar member, which receives a lock washer. The lock further includes two surfaces which are dimensioned to engage a nut placed on the end of a threaded member of a ball hitch. The engagement of the nut by the lock surfaces prevents the rotation of the nut and the removal of the ball hitch.

BRIEF DESCRIPTION OF THE DRAWINGS

The trailer hitch lock of the present invention may be more readily understood by reference to the following drawings. While certain embodiments are shown as illustrative examples of the tool lock, the scope of this application should not be construed as limited to these illustrative examples.

FIG. 1 is an exploded view of a trailer lock assembly of the present invention;

FIG. 2 is a front view of a trailer lock assembly in the locked position;

FIG. 3 is a side view of a trailer lock assembly in the locked position;

FIG. 4 is a top view of a trailer lock assembly of the present invention;

DETAILED DESCRIPTION OF THE INVENTION

Figure 5:
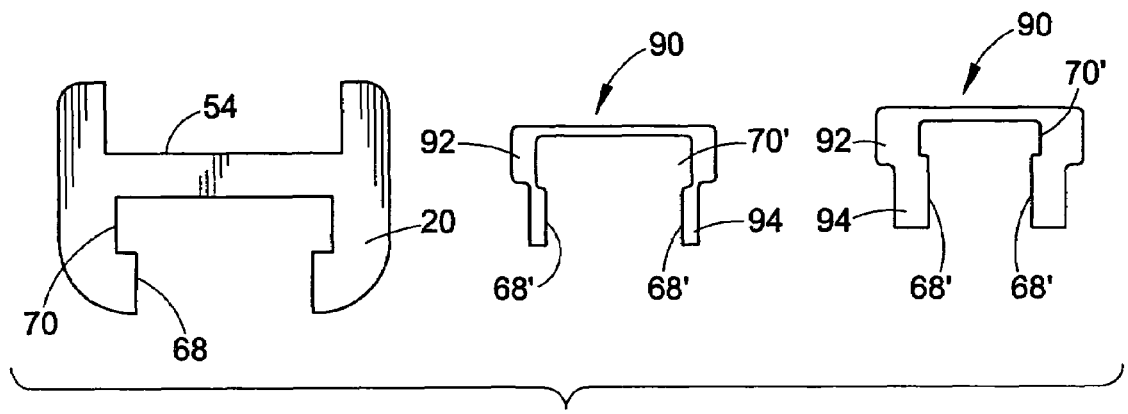
FIG. 5 illustrates a set of adapters for use with a trailer hitch lock.

The present invention is a lock assembly, generally referenced as 10, including a trailer hitch lock 20, a ball hitch 30, a lock washer 40 and a nut 42. The ball hitch 30 and the trailer hitch lock 20 engage one end of a vehicle receiver 46.

Figure 8:
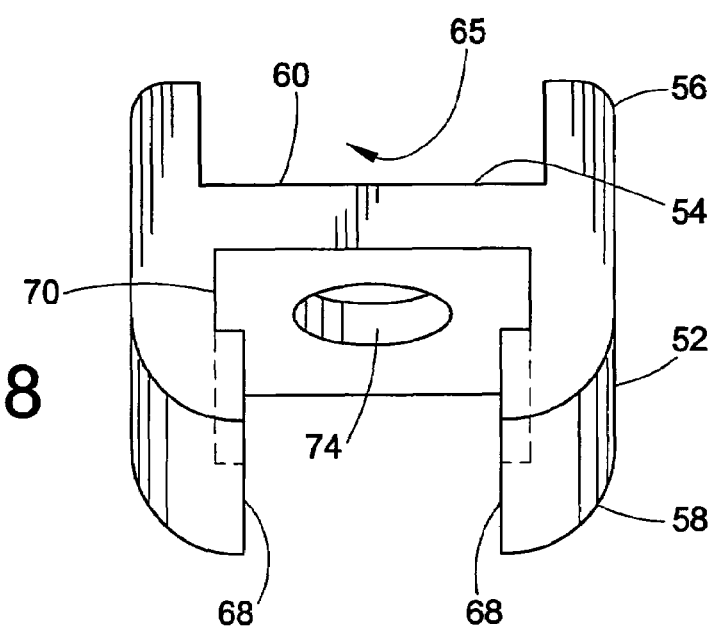
FIG. 8 illustrates a trailer hitch lock of the present invention.
Figure 9:
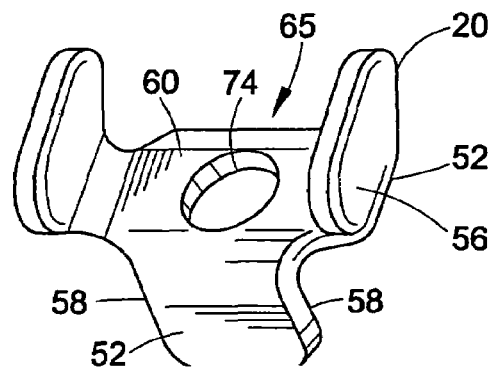
FIG. 9 is an alternative embodiment of the trailer lock assembly of the present invention.
Figure 10A:
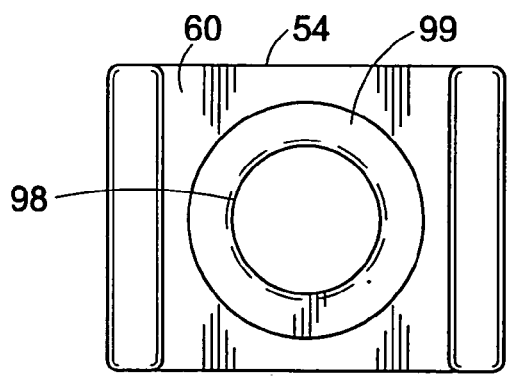
FIG. 10 is an alternative embodiment of the trailer lock assembly incorporating an integral treaded member.
Figure 10B:
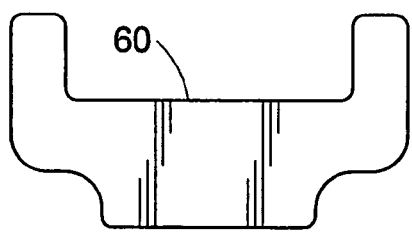
Figure 10C:
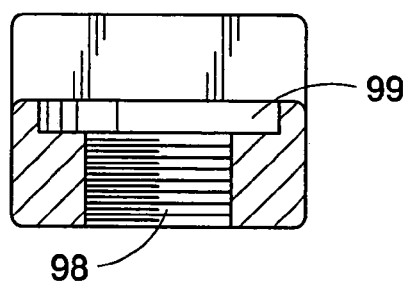
Figure 11:
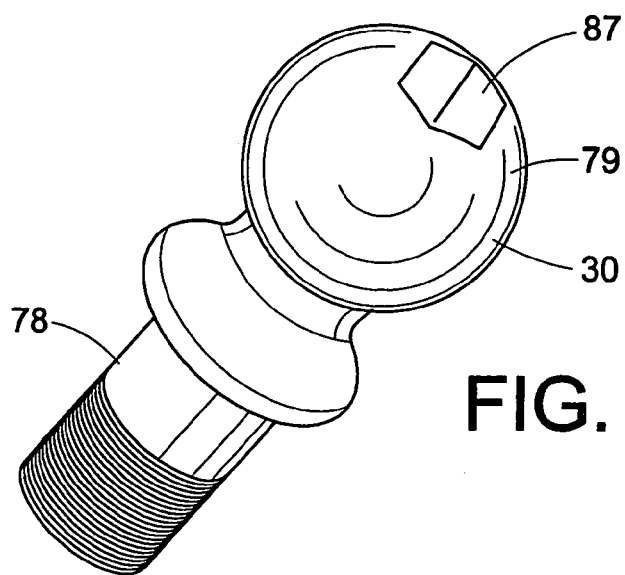
FIG. 11 is an alternative embodiment of a trailer hitch ball incorporating a hex drive.

The trailer hitch lock 20, as best shown in FIG. 8, is preferably a solid one piece metal unit made from extrusion, casting or machining from the solid. Optionally, the trailer hitch lock 20 can also be stamped and formed from sheet metal as shown in FIG. 10. The trailer hitch lock 20 is generally H-shaped with two side members 52 and a cross-bar member 54. The side members 52 have an upper portion 56 and a lower portion 58 each extending away from the cross-bar member 54. The two upper portions 56 of the side members 52 of the trailer hitch lock 20, along with the top surface 60 of the cross-bar member 54, provide a sliding recess 65 for receiving the vehicle receiver 46. By sliding the vehicle receiver 46 in the sliding recess 65, the trailer hitch lock 20 cannot be rotated. While the upper portions 56 of the side members 52 can be curved to secure the vehicle receiver 46 within the sliding recess 65, it is preferred that the upper portions 56 are generally straight so that the trailer hitch lock 20 can be universally used with vehicle receivers 46 of various thickness. The lower portions 58 of the side members 52 are thicker at the bottom and have interlocking surfaces 68 for securing the nut 42. When the nut 42 is engaged by interlocking surfaces 68, the nut 42 cannot be rotated, and therefore cannot be removed. In the embodiment shown in FIG. 8, a recess 70 is formed below the cross-bar member 54 to allow placement of the lock washer 40. If the trailer hitch lock 20 was to be used without a lock washer 40, recess 70 would not be needed and the lower portions 58 of the side members 52 could extend downward from the cross-bar member 54 with a universal diameter, equivalent to the diameter of the nut 42. While the upper portions 56 and lower portions 58 can be in the same plane, as shown in FIG. 8, the upper portions 56 and lower portions 58 can be rotated 90 degrees from one another as shown in FIG. 9. Optionally, the side members 52 can gripping surfaces 72 to allow for easier handling of the trailer hitch lock 20. The cross-bar member 54 has a hole 74 positioned and dimensioned for receiving the threaded portion 78 of the ball hitch 30.

The trailer ball hitch 30 can be a variety of known trailer ball hitches providing it includes a ball portion 79 and a threaded portion 78. The ball portion 79 is engaged by the trailer coupler 80 and locked into such engagement by a trailer coupler lock (not shown). Preferably, the trailer ball hitch 30 has at least one drive surface that is not accessible when the trailer coupler 80 is engaged. In the embodiment shown is FIG. 1, the ball hitch 30 has a set of side wrench flats 82 and an end drive socket 84 with end plug 86 to shield the drive socket from water and dirt. When engaged with the trailer coupler 80 both the side wrench flats 82 and the end drive socket 84 are covered by the trailer coupler 80 thereby preventing the trailer ball hitch 30 from being unscrewed.

To engage the lock assembly 10, the lock washer 40 is inserted into the recess 70 and the nut 42 is place between the interlocking surfaces 68 and both the lock washer 40 and the nut 42 are aligned with hole 74. Trailer hitch lock 20 is then positioned by sliding the sliding recess 65 around the vehicle receiver 46 and aligning the trailer hitch lock hole 74 with the receiver hole 88. The threaded portion 78 of the ball hitch 30 is placed through holes 74 and 88 and then driven through nut 42 preferably using drive surfaces 82 or 84. When a trailer coupler 80, with a trailer coupler lock, is secured to the ball portion 79 of the ball hitch 30, the trailer ball hitch 30 cannot be removed since the drive surfaces 82 and 84 are covered by the trailer coupler 80 and the nut 42 is engaged by the trailer hitch lock 20.

Figure 6:
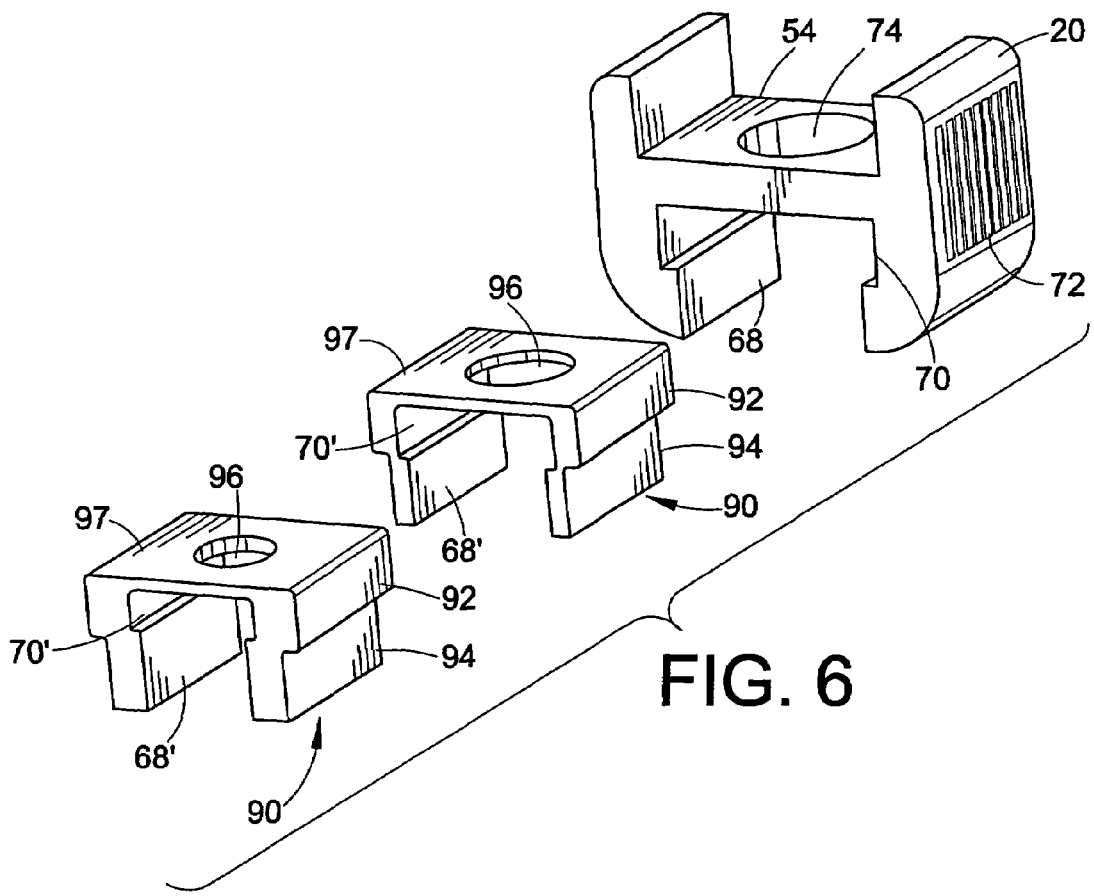
FIG. 6 is a perspective view of a trailer hitch lock and adapters.
Figure 7:
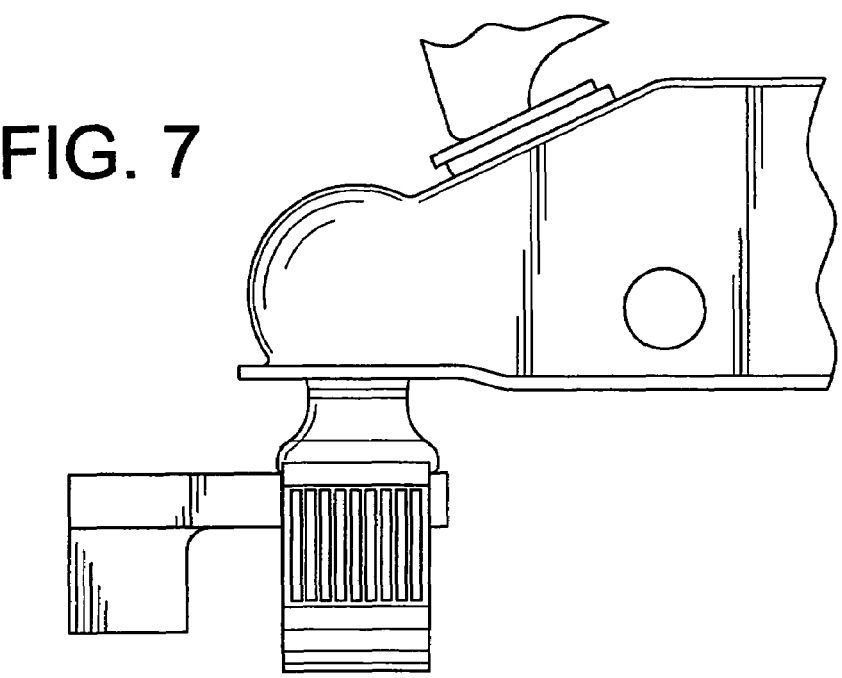
FIG. 7 illustrates a trailer lock assembly engaged by a trailer coupler.

As shown in FIGS. 5 and 6, one or more adapters 90 can be used to accommodate different nut 42 sizes. An adapter 90 can slide into the trailer hitch lock 20 under the cross-bar member 54 and the protruding members 92 of the adapter 90 slides into the lock washer recess 70. Each adapter 90 is formed similar to the bottom portion of the trailer hitch lock 20, with lower side portions 94, interlocking surfaces 68' and a lock washer recess 70'. As such, additional adapters 90 can be used until the distance between the interlocking surfaces 68' is small enough that the tolerance between the interlocking surfaces 68' and the nut 42 prohibits the nut from turning. Each adapter 90 can be secured into place by inserting the threaded portion 78 of the ball hitch 30 through the hole 96 in the top 97 of each adapter 90.

In another embodiment, the lock washer 40 and nut 42 are replaced by a threaded hole in the bottom of the trailer hitch lock 20. This embodiment has less components than other embodiments, however, it does not take advantage of the joint pre-load that the lock washer 40 maintains during vibration of the lock assembly 10. In order to provide a similar joint pre-load, this embodiment may include a thread patch or insert into the threaded joint.

It should be appreciated that the lock assembly 10 may have different configurations and different designs and that such designs are apart of the invention as they are provided for within the scope of the claims.

The invention claimed is:

1. A trailer hitch ball comprising:
a ball portion, a base portion and a threaded portion;
wherein an outer surface of said ball portion defines two parallel and opposing tool engaging surfaces;
further wherein said ball portion includes a drive socket that is formed as part of said ball portion such that when torque is applied to said drive socket, force is applied to the ball portion and the ball portion rotates relative to a trailer hitch.

2. The trailer hitch ball of claim 1, wherein said drive socket is hexagonally shaped.

3. A trailer hitch ball comprising:
a ball portion and a fastener portion;
wherein an outer surface of said ball portion defines two parallel and opposing tool engaging surfaces and said ball portion includes a drive socket cut into an outer surface of the ball portion, such as to form a continuous outer surface of said ball portion.

4. The trailer hitch ball of claim 3, wherein said ball portion is generally spherical.

5. The trailer hitch ball of claim 3, wherein said drive socket cut into said outer surface of the ball portion is hexagonally shaped.

6. The trailer hitch ball of claim 3, wherein said fastener portion includes a threaded stud member.

7. A trailer hitch ball comprising:
a ball portion;
a fastener portion; and
a drive socket located at a top of said ball portion, wherein said drive socket is formed as part of a continuous material with said ball portion;
further wherein an outer surface of said ball portion defines two parallel and opposing tool engaging surfaces.

8. The trailer hitch ball of claim 7, wherein said drive socket is hexagonal.

9. The trailer hitch ball of claim 7, wherein said drive socket is square.

10. The trailer hitch ball of claim 7, wherein torque that is applied to said drive socket is distributed throughout the ball portion and the ball portion rotates.

11. A trailer hitch ball comprising:
a ball portion;
a base portion; and
a threaded portion;
wherein said ball portion includes an integral drive member such that when torque is applied to said drive member, force is applied to said ball portion and said ball portion rotates relative to a trailer hitch; and
further wherein an outer surface of said ball portion defines two parallel and opposing tool engaging surfaces.

* * * * *